July 3, 1962  M. SCHWARTZ  3,041,777
ADJUSTABLE LEG FOR TABLES AND THE LIKE
Filed March 13, 1961

MILTON SCHWARTZ
INVENTOR.

BY Arthur Freilich

ATTORNEY

United States Patent Office 3,041,777
Patented July 3, 1962

3,041,777
ADJUSTABLE LEG FOR TABLES AND THE LIKE
Milton Schwartz, Plainview, N.Y., assignor to Advance Food Service Equipment, Inc., Westbury, N.Y., a corporation of New York
Filed Mar. 13, 1961, Ser. No. 95,168
3 Claims. (Cl. 45—139)

This invention relates generally to an adjustable leg for tables and the like and more particularly to a novel and improved adjustable leg which is free of any exposed threads.

Health departments in many areas of the country require that commercial restaurant equipment be free of any exposed threads inasmuch as it has been found that dirt often collects in such threads thereby establishing an undesirable and unsanitary condition. Due to the fact that floors are often warped and means must be provided on tables and the like for leveling them to compensate for the warpage, recent attempts have been made to devise a means for leveling which is free of exposed threads.

The most common practice employed for adjusting leg length in the absence of exposed threads is to weld a nut or such in a pipe leg and utilize a bolt serving as a foot which extends up into the leg and is in threaded engagement with the nut. This practice requires that care be exercised in properly placing the nut within the pipe leg and also necessitates welding the nut to the pipe leg. A more recent practice, as disclosed in United States Patent No. 2,956,368, utilizes a cylindrical insert which is secured in a pipe leg and is properly positioned by virtue of a flange on the insert which abuts against the bottom surface of the pipe leg. The insert has a closed upper wall with a screw downwardly depending therefrom. Within the annular space defined between the externally threaded depending screw and the outer wall of the insert is received an internally threaded foot which engages the screw. This type of arrangement works satisfactorily but the insert utilized is relatively expensive to manufacture. Moreover, the diameter of the insert and the foot at their respective threaded portions is small which in turn means that the contact area between the insert and foot is small thereby making the amount of weight sustained by each unit of contact area relatively large.

In the light of the inadequacies of the prior art, herein is disclosed an improved arrangement for permitting the incremental extension of the length of a pipe leg which may be utilized on tables and the like. Accordingly, it is the principal object of this invention to provide an adjustable leg which is free of exposed threads, and which is extremely simple in structural detail and correspondingly inexpensive to manufacture and utilize.

It is a further object of this invention to provide means which are capable of being readily incorporated with conventional pipe legs for permitting easy incremental extension of the length thereof.

Briefly, the invention includes two members which may be inexpensively formed and easily installed within a pipe leg. The invention contemplates the use of a bushing formed of hard rubber or any other material capable of being force fitted into a pipe. The bushing is provided with a radially extending flange on one end thereof which limits, by abutting against one end of the pipe, the distance that the bushing may be inserted into the pipe. The bushing defines an axial passageway including an enlarged diameter passage portion provided with internal threads and a reduced diameter passage portion adjacent the bushing end with the flange. A second member, comprising an adjustable foot, has an externally threaded enlarged diameter portion on a first end thereof and a reduced diameter portion on a second end thereof.

The adjustable foot is receivable in the bushing in threaded engagement therewith. The reduced passage portion of the bushing defines a smaller inner diameter than the outer diameter of the enlarged portion of the adjustable foot, and accordingly the adjustable foot may not be withdrawn from the bushing from the flanged end thereof. Likewise, dirt can not enter through this end and become lodged in the threads.

Other objects and advantages which will become subsequently apparent reside in the details of construction and operation as more fully hereinafter described and claimed, reference now being had to the accompanying drawings forming a part hereof, wherein like numerals refer to like parts through and in which:

Figure 1:
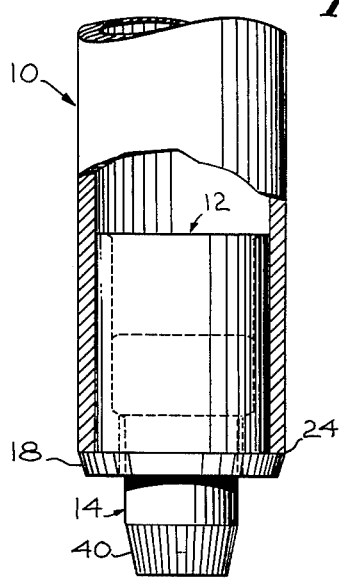
FIGURE 1 is a fragmentary side elevation view, partially broken away, of the invention operatively disposed within a pipe.
Figure 2:
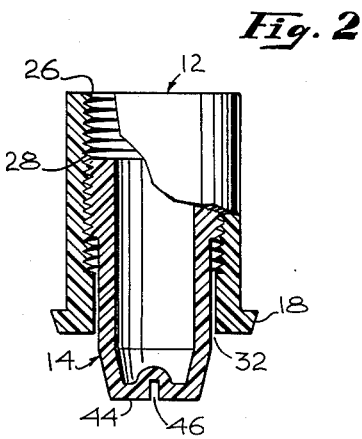
FIGURE 2 is a side elevation view, partially broken away, of the two members of the invention showing them removed from a pipe.
Figure 3A:
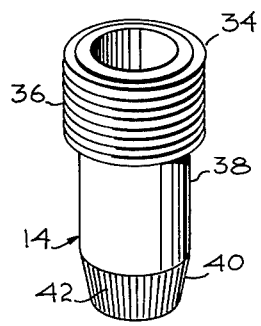
FIGURE 3 is a perspective view of the invention showing in (a) the adjustable foot which may be received as indicated in the bushing illustrated in (b).
Figure 3B:
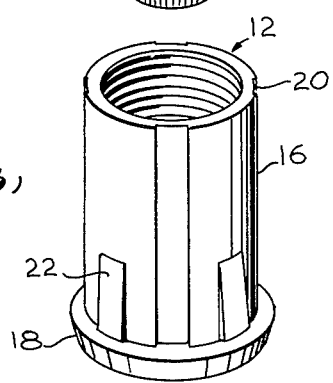

With continuing reference to the drawing, initial attention is called to FIGURE 1 wherein numeral 10 indicates a pipe which is adapted to be secured at its upper end (not shown) in any conventional manner to a table or the like. As previously pointed out, inasmuch as floors are often warped, it is desirable to provide means for selectively incrementally extending the length of a leg to compensate for the warpage. In order to enable a user to selectively extend the length of a leg, applicant herein provides a first member in the form of a bushing, generally designated by the numeral 12 and a second member in the form of an adjustable foot generally designated by the numeral 14.

Bushing 12 is formed of hard rubber or any other material capable of being force fitted. The bushing 12 includes an upper cylindrical portion 16 and a radially extending flange 18 terminally disposed on the bushing. The cylindrical portion 16 is provided on its outer surface with axially extending slots 20 spaced along the circumference. The slots 20 facilitate the insertion of the bushing 12 into the pipe 10 in the event that any high spots or other deformities exist within the pipe. It is contemplated that the outer diameter of the cylindrical portion 16 of the bushing 12 be equal to or slightly greater than the inner diameter of the pipe 10 so that when the bushing 12 is forced under pressure into the pipe to the position indicated in FIGURE 1, secure engagement will result between the bushing 12 and the pipe 10. In order to further assure that the bushing 12 is properly secured in the pipe 10 when forced therein, tapered lugs 22 extend from the outer circumference of the cylindrical portion 16 of the bushing 12 adjacent the flange 18. As will be apparent, the lugs 22 are tapered so as to be wedged against the pipe 10 to secure the bushing 12. The bushing 12 should be inserted into the pipe 10 until flange 18 engages the radially extending end surface of the pipe as indicated by the numeral 24 in FIGURE 1.

Bushing 12 defines a passageway therethrough including an internally threaded enlarged diameter passage portion 26 and a reduced diameter passage portion 32. The threads 28 on the enlarged passage portion 26 extend from the end of the bushing 12 remote from the flange 18 through approximately three quarters of the axial length of the bushing and terminate at the reduced passage portion 32.

The adjustable foot 14 which may also be formed of hard rubber includes an externally threaded enlarged diameter portion 34. The threads 36 on portion 34 extend approximately along one third of the length of the foot 14. The foot 14 further includes a reduced diameter portion 38 and a tapered terminal portion 40 which is knurled as at 42 on the outer surface thereof. The foot 14 is closed at its bottom by surface 44 in which is defined depression 46 which is adapted to receive a screw driver blade.

The threads 36 defined on the foot 14 are adapted to engage the thread 28 on the bushing 12. In order to assemble the adjustable leg, the foot 14 is coaxially disposed within the bushing 12 from the end thereof remote from the flange 18. The foot 14 must be inserted into the bushing 12 prior to insertion of the bushing 12 into the pipe 10. Threads 36 of foot 14 are engaged with threads 28 of bushing 12. The bushing 12 is then force fitted into the pipe 10 so that it is securely held therein. By utilizing a screw driver blade receivable in depression 46 in surface 44 or by turning the foot 14 with fingers gripped around the knurled portion 42, the foot 14 may be drawn through the bushing 12 the desired distance to extend the length of the pipe. It is to be noted that the outer diameter of the enlarged portion 44 of the foot 14 is greater than the inner diameter of the reduced passage portion of the bushing 12. It accordingly will be realized that the foot 14 can not be withdrawn from the bushing 12. Likewise, it should be appreciated that the outer diameter of the reduced portion 38 of foot 14 is only very slightly smaller than the inner diameter of the reduced passage portion 32 of the bushing 12. Accordingly, it is virtually impossible for any dirt to become lodged in the threads 28 and 36.

From the foregoing, it will be realized that the applicant has disclosed herein a novel and improved arrangement which extends the state of the art by providing a simpler and less expensive means for affecting the incremental extension of a pipe leg usable on tables and the like. Even more important, however, applicant has provided a device which fully complies with all known health requirements thereby assuring the maintenance of the highest sanitary standards in commercial establishments.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In combination with a pipe adaptable for use as a leg on tables and the like, means for extending the length of said pipe by selected increments comprising an internally threaded cylindrical member having a radially extending terminal flange, said member extending into said pipe with said flange in abutting engagement with an end surface thereof; an externally threaded foot coaxially disposed within said member and in threaded engagement therewith, said cylindrical member defining an axial passage extending therethrough including an enlarged passage portion adjacent a first end of said member and a reduced passage portion adjacent a second end of said member, said internal threads being formed on said enlarged passage portion, said foot including an enlarged portion on a first end thereof and a reduced portion on a second end thereof, said enlarged portion of said foot being externally threaded and having a greater outer diameter than the inner diameter of said reduced passage portion.

2. The combination of claim 1 wherein said member normally defines an outer diameter greater than the inner diameter of said pipe and said member is secured in said pipe by a forced fit.

3. The combination of claim 1 wherein said foot has a closed radial extending surface on said second end thereof including a depression adapted to receive a screwdriver blade therein.

References Cited in the file of this patent

UNITED STATES PATENTS

| | | |
|---|---|---|
| 948,708 | Sheppard | Feb. 8, 1910 |
| 1,289,473 | Keating | Dec. 31, 1918 |
| 2,956,368 | Klein | Oct. 18, 1960 |